G. B. NORRIS.
WHEELED TRUCK.
APPLICATION FILED SEPT. 11, 1909.
960,685.
Patented June 7, 1910.
2 SHEETS—SHEET 2.
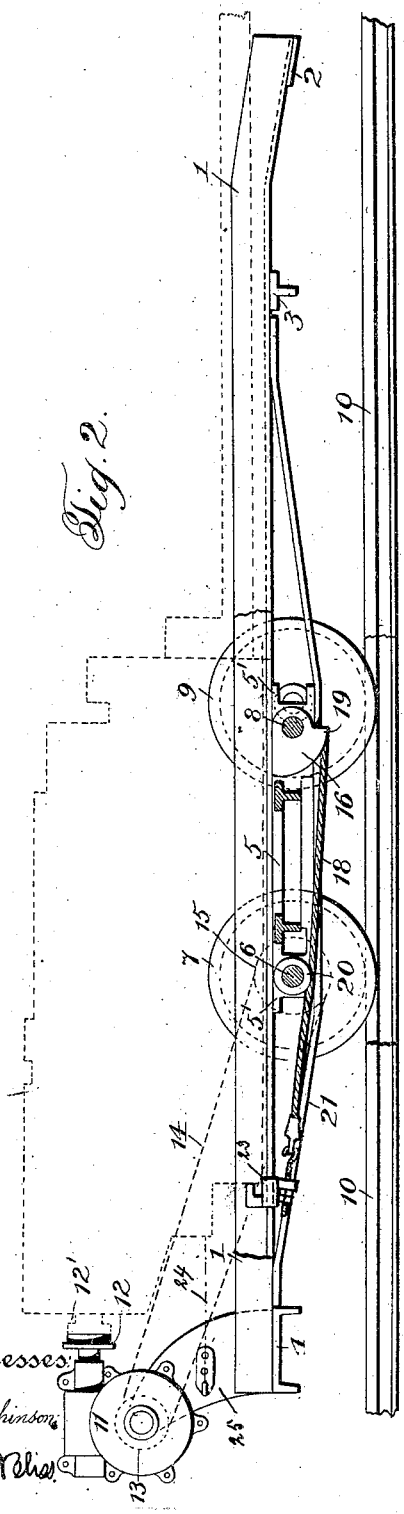
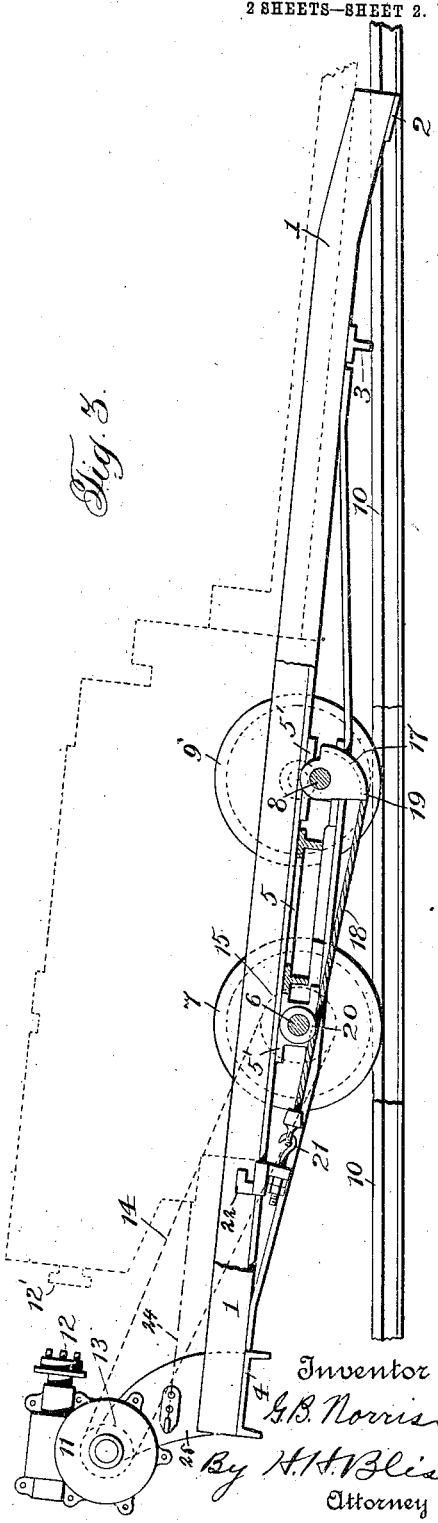
Witnesses
Jas E Hutchinson
George R Bliss
Inventor
G. B. Norris
By H. H. Bliss
Attorney

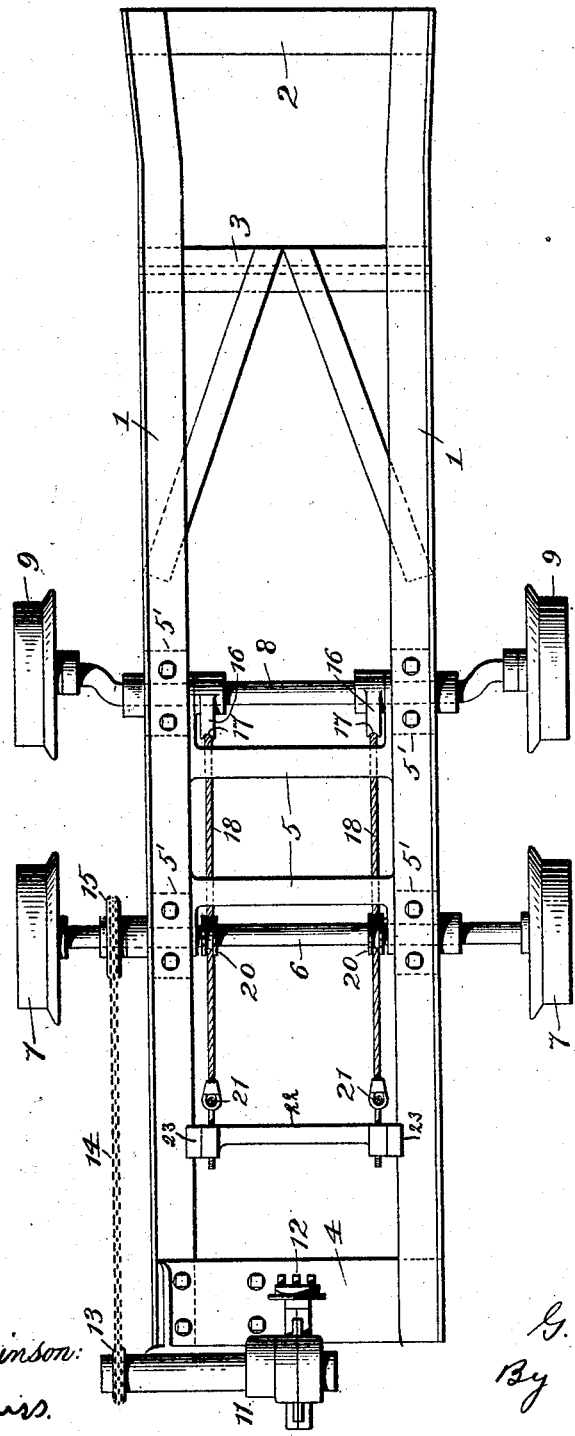

UNITED STATES PATENT OFFICE.

GEORGE B. NORRIS, OF COLUMBUS, OHIO, ASSIGNOR TO THE JEFFREY MANUFACTURING COMPANY, A CORPORATION OF OHIO.

WHEELED TRUCK.

960,685.   Specification of Letters Patent.   Patented June 7, 1910.

Application filed September 11, 1909. Serial No. 517,276.

*To all whom it may concern:*

Be it known that I, GEORGE B. NORRIS, a citizen of the United States, residing at Columbus, in the county of Franklin and State of Ohio, have invented certain new and useful Improvements in Wheeled Trucks, of which the following is a specification, reference being had therein to the accompanying drawing.

This invention relates to trucks, and has as its object to provide a truck onto which and from which a mining machine or other body can be readily loaded or unloaded.

Figure 1 of the drawings is a plan view of a truck embodying my invention. Fig. 2 is a side elevation of the same, a mining machine being indicated thereon in phantom. Fig. 3 is a side elevation of the truck with the front end depressed and in position for unloading or loading a mining machine, the mining machine being indicated by dotted lines in this figure also.

It has been customary in using trucks of this kind to depress one end of the truck and consequently to raise the axle and wheels at the opposite end of the truck from the ground when it has been desired to put the truck in position for loading or unloading a mining machine. When the truck is thus tilted on its front axle as a fulcrum the rear end is raised sufficiently high to occasion serious difficulty in rooms where the coal is found in very thin veins, the rear end of the truck or the mechanism carried by the rear end frequently striking the roof of the room.

A truck built in accordance with my invention is provided with a front supporting construction of such a type that the forward end of the truck may be lowered with respect to the front axle and again elevated to position after the mining machine has been moved into place upon the truck. The frame of the truck comprises the side rails 1, 1 and cross bars 2, 3 and 4. To the side bars 1 is bolted a cast iron frame 5 which is provided with bearing boxes 5' for the axles 6 and 8 upon which are keyed the track wheels 7, 7 and 9, 9. The forward axle is bent at each end between the bearing box and the wheel in such a manner that all of the parts of the axle lie in a single plane. When the bent axle is in such an angular position that its plane is horizontal, that is when the extreme end portions of the axle are in the same horizontal plane with the central portion, the front end of the truck is supported in its elevated horizontal position. On the other hand when the central part of the axle lies in the same vertical plane with the axle ends but in a lower horizontal plane, the forward end of the truck is lowered into contact with the ground or floor.

On the cross bar 4 a gear housing 11 is mounted which contains power transmitting gearing adapted to apply power to the truck wheels. At one end of this train of power transmitting gearing is the clutch member 12 which is mounted in such a position and is of such a character as to be adapted to engage with a similar clutch member 12' on the mining machine, the mining machine clutch member being operatively connected with the mining machine motor or engine. At the other end of the train of power transmitting gearing in the housing 11 is the sprocket wheel 13 which is connected by the sprocket chain 14 to the sprocket wheel 15 keyed upon the axle 6. In this manner the power of the mining machine motor is utilized to propel the truck bodily along the tracks 10 in the mine.

Cam blocks 16, having peripherally grooved edges 17, are keyed to the axle 8, preferably at points between the axle boxes. The grooves 17 are spirally formed with respect to the adjacent part of the axle 8, the forward end of the groove being at a less radial distance from the axle than the rear end of the groove. At the forward end 19 of the grooved edge 17 of each of the cam blocks there is fastened one end of a rope 18 which engages the grooved edge 17 and passes over the idler pulley 20, loosely sleeved upon the rear axle 6, being attached at its rear end to a hook 21 which is adjustably secured by means of a screw threaded engagement to the cross bar 22. This cross bar is provided at each end with shoes 23 which engage the inner edges of the side frame bars or rails 1, 1 so as to permit horizontal movement of the cross bar with respect to the frame bars, while preventing vertical displacement. The central portion of this cross bar 22 is elevated above the ends which engage with the frame bars 1, and is accordingly in such a position vertically that it will be engaged by the advancing end of the mining machine as it is moved into position upon the truck. It will be understood that any one of the well known means can be employed for moving the mining machine as it is loaded or unloaded; in the drawings a rope 24 is secured at one end to the standard 25, which supports the gear housing 11, and at its other end is wound upon a winch mechanism carried by the mining machine and operated by the mining machine motor or engine. By means of this rope and winch mechanism the mining machine is enabled to draw itself upon the truck. To unload the mining machine it is only necessary to secure the free end of the rope 25 to some fixed point beyond the other end of the truck and to put in operation the winch mechanism.

The operation of the truck is as follows: The front end of the truck being in its lowermost position, the mining machine is started upon the inclined truck rails 1, and is moved rearwardly and upwardly until the advancing end of the mining machine engages the cross bar 22. At this juncture the ropes 18 are tightened and drawn rearward by the movement of the mining machine and the cam blocks 16 together with the axle 8 by which they are rigidly carried are pulled rearward in an arc of a circle about the axis of the extreme end portions of the axle 8 as a center. In this way the central part of the axle 8 and the forward end of the truck are elevated until the clutch members 12 and 12' are brought into engagement with each other. The mechanism is so designed that the truck will assume its normal horizontal position when the mining machine has reached the point necessary to bring the clutch elements into engagement. After the mining machine has been thus placed in position upon the truck the power of the mining machine motor is used to propel the truck and mining machine along the mine track to any desired locality.

When the mining machine is being removed from the truck the bar 22 is released and allows the axle 8 to rotate downwardly until the front end of the truck is lowered into contact with the ground.

What I claim is:

1. The combination of a wheeled mining machine truck, devices upon the truck adapted to incline it longitudinally and mounted in position to be engaged and operated by a mining machine as it is moved into position upon the truck irrespective of the position of the center of gravity of the mining machine with respect to the axis about which the truck is inclined.

2. The combination in a truck, of a frame and two supporting axles therefor, wheels on the axles, guides on the frame for receiving an article to be carried by the truck, the frame being tiltable with respect to the plane common to the two axles so as to incline the said guides to the horizontal, and means adapted to convert the movement of the article along the guides on the truck into a tilting movement of the frame, said means operating independently of the position of the center of gravity of the article.

3. The combination of a wheeled truck adapted to carry a mining machine, and power transmitting mechanism carried by the truck operable by the movement of the mining machine with respect to the truck for elevating one end of the truck from a relatively low to a horizontal position.

4. The combination of a truck frame adapted to carry relatively heavy objects, two axles and wheels thereon for supporting the frame, and power transmitting mechanism controllable by the position of the said object with respect to the truck for inclining the truck frame relatively to the plane common to the said axles.

5. The combination of a frame, longitudinally arranged horizontal guides on the frame for receiving a mining machine, a rear axle and wheels thereon bodily immovably mounted in the frame, and a front axle and wheels bodily movably mounted in the frame, and means operable by the moving mining machine for moving the frame with respect to the front axle.

6. A truck comprising a frame, a rear axle and wheels, a front wheel and an axle therefor journaled in the frame and bent between the wheel and the journal, power transmitting mechanism adapted to be operated by a moving article on the frame for angularly adjusting the axle.

7. A wheeled truck for transporting heavy objects having an axle journaled in its frame, a wheel on the axle, the axle being bent between the wheel and journal, means for angularly adjusting the axle, and means for locking said adjusting means, said locking means being adapted to be operated by the object transported.

8. A wheeled truck for transporting heavy objects having a supporting wheel journaled on a support movable in an arc of a circle with respect to the truck frame, and a draft device secured to said support eccentrically to the center of said arc, and means for holding the draft device in varying positions relative to the frame.

9. In a tilting truck, the combination with a low horizontal track platform, of two pairs of supporting wheels, mechanism for joining one of said pairs of supporting wheels to said platform, and mechanism for joining the other pair of said wheels to said platform for up and down adjustment of the platform, and means operating said adjusting mechanism, said operating means being automatically controlled by an article on the truck.

10. The combination of a wheeled mining machine truck, comprising a platform and two pairs of wheels, the platform being adjustable with respect to one of the pairs of wheels, with means upon the truck for locking the platform in elevated position with respect to the said pair of wheels, said locking means being operated by the mining machine as it moves into position upon the truck.

11. The combination in a truck, of a platform and two pairs of supporting wheels therefor, mechanism joining one pair of the wheels with the platform, mechanism joining the other pair of wheels with the platform permitting a lowering of that end of the platform in position to receive a mining machine, power mechanism for moving a mining machine into position upon the platform, and devices for elevating the platform with respect to the second pair of wheels adapted to be operated by said power mechanism.

In testimony whereof I affix my signature, in presence of two witnesses.

GEORGE B. NORRIS.

Witnesses:
H. B. ALEXANDER,
M. ERLANGER.